United States Patent
Araki et al.

(10) Patent No.: US 7,470,804 B2
(45) Date of Patent: *Dec. 30, 2008

(54) MAGNESIUM ALLOY-BONDING ORGANOPOLYSILOXANE COMPOSITION AND COMPOSITE ARTICLE

(75) Inventors: Tadashi Araki, Gunma-ken (JP); Tsuneo Kimura, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 273 days.

This patent is subject to a terminal disclaimer.

(21) Appl. No.: 11/214,810

(22) Filed: Aug. 31, 2005

(65) Prior Publication Data

US 2006/0047133 A1   Mar. 2, 2006

(30) Foreign Application Priority Data

Sep. 1, 2004   (JP) ............................. 2004-254461

(51) Int. Cl.
C07F 7/00 (2006.01)
C09J 103/04 (2006.01)
B60C 1/00 (2006.01)
C08G 77/12 (2006.01)

(52) U.S. Cl. .................. 556/450; 524/261; 156/329; 528/31; 528/34

(58) Field of Classification Search .................. None
See application file for complete search history.

(56) References Cited

U.S. PATENT DOCUMENTS 6,645,339 B1 * 11/2003 DeCato ................... 156/329

FOREIGN PATENT DOCUMENTS

JP   2002-309219 A   10/2002
JP   2003-535152 A   11/2003

* cited by examiner

*Primary Examiner*—Samuel A Barts
(74) *Attorney, Agent, or Firm*—Birch, Stewart, Kolasch & Birch, LLP

(57) ABSTRACT

An organopolysiloxane composition comprising an organopolysiloxane, an organosilicon compound having at least three hydrolyzable radicals in the molecule, an acid anhydride and optionally a filler cures at room temperature and exhibits excellent adherence to magnesium alloys.

5 Claims, No Drawings

MAGNESIUM ALLOY-BONDING ORGANOPOLYSILOXANE COMPOSITION AND COMPOSITE ARTICLE

CROSS-REFERENCE TO RELATED APPLICATION

This non-provisional application claims priority under 35 U.S.C. §119(a) on Patent Application No. 2004-254461 filed in Japan on Sep. 1, 2004, the entire contents of which are hereby incorporated by reference.

TECHNICAL FIELD

This invention relates to an organopolysiloxane composition which is curable at room temperature and adherent to magnesium alloys, and a composite article comprising a magnesium alloy and the cured organopolysiloxane composition.

BACKGROUND ART

Due to their light weight, strength, corrosion resistance, freedom of design and recyclability, magnesium alloys as typified by AZ-31 and AZ-91 are recently used in a wide variety of applications including information electronic equipment such as mobile phones, digital video cameras, digital cameras, liquid crystal projectors, plasma displays, personal computers, MD players, DVD recorders, and vehicle components, typically automotive components such as electric and electronic parts, oil pans, intake manifolds, lock housing parts, steering upper brackets, and steering wheels. It would be desirable to have an organopolysiloxane composition which is self-adhesive to magnesium alloy members.

Magnesium alloy members, however, are extremely difficult to bond. Prior to bonding, they must be modified by chemical treatment. Few studies have been made on sealing materials and adhesives which are self-adhesive to magnesium alloy members without a need for such treatment. For organopolysiloxane compositions which are self-adhesive to magnesium alloys, only a few techniques have been proposed. U.S. Pat. No. 6,645,339 (corresponding to JP-A 2003-535152) discloses a composition comprising a curable silicone, an amino-containing silane adhesion promoter, and a filler; and JP-A 2002-309219 discloses a composition comprising a silicone oil and an inorganic compound containing a metal element having a higher standard electrode potential than magnesium as a curing agent. As to the former, the amino-containing silane adhesion promoters such as γ-aminopropyltrialkoxysilane and trialkoxypropylethylenediamine are less effective. The latter composition lacks the freedom of material design because of limitations by a particular filler used therein.

SUMMARY OF THE INVENTION

An object of the present invention is to provide an organopolysiloxane composition which is fully self-adhesive to magnesium alloys, and a composite article comprising a magnesium alloy and the cured organopolysiloxane composition.

Making extensive investigations with a focus on the uniqueness of magnesium alloy adherends, the inventor has discovered that an organopolysiloxane composition comprising (A) at least one of organopolysiloxanes having the general formulae (1) to (3), (B) an organosilicon compound having at least three hydrolyzable radicals in the molecule and/or a partial hydrolyzate thereof, (C) an acid anhydride (excluding acid anhydride functional silane coupling agents) and preferably (D) a filler exhibits excellent self-adherence to magnesium alloys.

More particularly, the amino-containing silane adhesion promoters are effective to ordinary adherends as typified by glass, but less adherent to magnesium alloys as demonstrated in comparative examples using γ-aminopropyltriethoxysilane and ethylenediaminopropyltrimethoxysilane, to be described later. When acid anhydrides are used instead, the adherence to magnesium alloys is dramatically improved.

Accordingly the present invention provides an organopolysiloxane composition for magnesium alloy bonding comprising (A) 100 parts by weight of at least one organopolysiloxane selected from the group consisting of organopolysiloxanes having the general formulae (1) to (3), (B) 0.1 to 50 parts by weight of an organosilicon compound having at least three hydrolyzable radicals each bonded to a silicon atom in the molecule and/or a partial hydrolyzate thereof, (C) 0.1 to 15 parts by weight of an acid anhydride excluding acid anhydride functional silane coupling agents, and preferably (D) 1 to 500 parts by weight of at least one filler.

$$HO(SiR_2O)_nH \qquad (1)$$

Herein R is each independently a substituted or unsubstituted monovalent hydrocarbon radical of 1 to 10 carbon atoms, and n is an integer of at least 10.

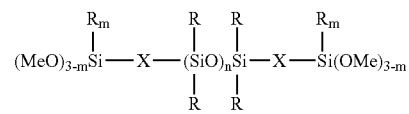
(2)

Herein R and n are as defined above, Me is methyl, X is an oxygen atom or an alkylene radical of 2 to 5 carbon atoms, m is independently 0 or 1.

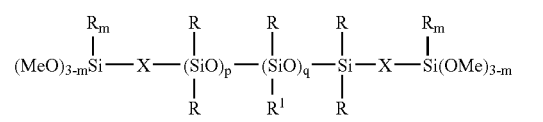
(3)

Herein R, Me, X and m are as defined above, p is an integer of at least 10, q is an integer of 1 to 5, and $R^1$ is a branching chain containing a hydrolyzable radical of the formula (4):

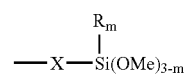
(4)

wherein R, Me, X and m are as defined above.

Also contemplated herein is a composite article comprising a magnesium alloy and the organopolysiloxane composition in the cured state bonded thereto.

The organopolysiloxane composition of the invention is curable at room temperature and exhibits excellent adherence to magnesium alloys.

DESCRIPTION OF THE PREFERRED EMBODIMENTS

The organopolysiloxane composition for bonding and sealing magnesium alloys according to the present invention is defined as comprising (A) at least one member selected from among organopolysiloxanes having the general formulae (1) to (3), (B) an organosilicon compound having at least three hydrolyzable radicals each bonded to a silicon atom in the molecule and/or a partial hydrolyzate thereof, (C) an acid anhydride excluding acid anhydride functional silane coupling agents, and preferably (D) at least one filler.

Component A

The organopolysiloxane (A) used herein is one or a mixture of organopolysiloxanes having the general formulae (1) to (3).

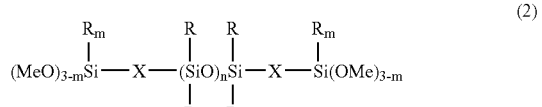

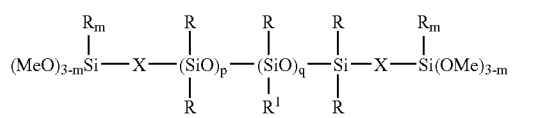

In formulae (1) to (3), R which may be the same or different is a substituted or unsubstituted, monovalent hydrocarbon radical of 1 to 10 carbon atoms, Me is methyl, and X is an oxygen atom or an alkylene radical of 2 to 5 carbon atoms. The subscript n is an integer of at least 10, m is independently an integer of 0 or 1, p is an integer of at least 10, and q is an integer of 1 to 5. $R^1$ is a branching chain containing a hydrolyzable radical of the formula (4):

wherein R, Me, X and m are as defined above.

In formulae (1) to (3) representing the organopolysiloxanes as component (A) and formula (4), R is selected from substituted or unsubstituted, monovalent hydrocarbon radicals of 1 to 10 carbon atoms, preferably 1 to 6 carbon atoms, for example, alkyl radicals such as methyl, ethyl and propyl, cycloalkyl radicals such as cyclohexyl, alkenyl radicals such as vinyl and allyl, aryl radicals such as phenyl and tolyl, and substituted forms of the foregoing radicals in which some hydrogen atoms are replaced by halogen atoms or the like, such as 3,3,3-trifluoropropyl. Of these, methyl, vinyl, phenyl and 3,3,3-trifluoropropyl are preferred, with methyl and 3,3,3-trifluoropropyl being most preferred. A plurality of R's in formulae (1) to (4) may be the same or different.

X in formulae (2), (3) and (4) is an oxygen atom or an alkylene radical of 2 to 5 carbon atoms, for example, ethylene, propylene, and butylene. Of these, oxygen and ethylene are preferred.

The subscript n is an integer of at least 10, preferably such an integer that the diorganopolysiloxane may have a viscosity in the range of 25 to 500,000 mPa·s at 23° C., more preferably 500 to 100,000 mPa·s at 23° C. The subscript m is independently an integer of 0 or 1.

The subscript p is an integer of at least 10, preferably such an integer that the organopolysiloxane may have a viscosity in the range of 500 to 500,000 mPa·s at 23° C., more preferably 1,000 to 100,000 mPa·s at 23° C. The subscript q is an integer of 1 to 5, preferably 1 to 3. It is noted that the viscosity is measured at 23° C. by a rotational viscometer.

Component B

Component (B) is an organosilicon compound having at least three hydrolyzable radicals each bonded to a silicon atom in the molecule and/or a partial hydrolyzate thereof. The preferred organosilicon compound has the general formula (5):

$$R^2_a SiR^3_{4-a} \qquad (5)$$

wherein $R^2$ is a monovalent hydrocarbon radical, $R^3$ is a hydrolyzable radical, and "a" is 0 or 1, preferably 1.

Examples of the hydrolyzable radical ($R^3$) that the organosilicon compound or hydrolyzate thereof possesses include ketoxime, alkoxy, acetoxy, and isopropenoxy radicals.

The remaining radicals ($R^2$) bonded to the silicon atom other than the hydrolyzable radicals are not particularly limited as long as they are monovalent hydrocarbon radicals. Exemplary monovalent hydrocarbon radicals are those of 1 to 10 carbon atoms, including alkyl radicals such as methyl, ethyl, propyl and butyl, alkenyl radicals such as vinyl, and aryl radicals such as phenyl. Of these, methyl, ethyl, vinyl and phenyl are preferred.

Illustrative, non-limiting examples of the organosilicon compound (B) include ketoxime silanes such as tetrakis(methylethylketoxime)silane, methyltris(dimethylketoxime)silane, methyltris(methylethylketoxime)silane, ethyltris(methylethylketoxime)silane, methyltris(methylisobutylketoxime)silane, and vinyltris(methylethylketoxime)silane; alkoxysilanes such as methyltrimethoxysilane, vinyltrimethoxysilane, phenyltrimethoxysilane, tetramethoxysilane, vinyltriethoxysilane, and tetraethoxysilane; acetoxysilanes such as methyltriacetoxysilane and vinyltriacetoxysilane; isopropenoxysilanes such as methyltriisopropenoxysilane, vinyltriisopropenoxysilane and phenyltriisopropenoxysilane; and partial hydrolytic condensates of the foregoing silanes. These silanes may be used alone or in admixture of two or more.

Component (B) is compounded in an amount of 0.1 to 50 parts by weight, preferably 5 to 30 parts by weight per 100 parts by weight of component (A). Less than 0.1 pbw of component (B) fails to induce sufficient crosslinks or produce a composition having the desired rubbery elasticity whereas more than 50 pbw of component (B) often results in a cured product having poor mechanical properties.

Component C

The acid anhydride as component (C) is essential to impart satisfactory magnesium alloy adherence to the inventive composition. The preferred acid anhydrides are acid anhydrides of about 4 to about 25 carbon atoms, preferably about 4 to about 20 carbon atoms, containing one or two aliphatic or aromatic rings and one or two acid anhydride radicals (i.e., —CO—O—CO— radicals) within the molecule, for example, maleic anhydride, phthalic anhydride, succinic anhydride, methylsuccinic anhydride, glutaric anhydride, itaconic anhydride, and 3,3',4,4'-benzophenonetetracarboxylic dianhydride. The acid anhydrides which can be used herein exclude acid anhydride functional silane coupling agents, typically acid anhydride silanes having an alkoxy radical bonded to a silicon atom within the molecule such as succinic anhydride propyltrimethoxysilane.

Component (C) is compounded in an amount of 0.1 to 15 parts by weight, preferably 0.2 to 10 parts by weight per 100 parts by weight of component (A). Less than 0.1 pbw of component (C) fails to provide adherence to magnesium alloys whereas more than 15 pbw of component (C) detracts from rubbery physical properties and is uneconomical.

Component D

In the inventive composition, (D) a filler may be compounded. Both reinforcing and non-reinforcing fillers may be used for imparting rubber physical properties to the inventive composition. Exemplary fillers include fumed silica which may or may not be surface treated, precipitated silica, wet silica, carbon powder, talc, bentonite, calcium carbonate which may or may not be surface treated, zinc carbonate, magnesium carbonate, calcium oxide which may or may not be surface treated, zinc oxide, magnesium oxide, aluminum oxide, and aluminum hydroxide. They may be used alone or in admixture.

The filler is compounded in an amount of 1 to 500 parts by weight, preferably 5 to 450 parts by weight per 100 parts by weight of component (A). Less than 1 pbw of the filler may fail to achieve the desired bond strength to magnesium alloys due to the lack of rubber strength whereas more than 500 pbw of the filler may result in a composition which is too viscous to work.

Other Components

In addition to the foregoing components, any well-known additives and catalysts may be added to the inventive composition as long as they do not have negative impact on the cure at room temperature and the self-adherence to magnesium alloys of the composition. Suitable additives include thixotropic agents such as polyethers, colorants such as pigments and dyes, heat resistance modifiers such as red iron oxide and cerium oxide, freeze resistance modifiers, rust preventives, plasticizers, and oil resistance modifiers such as potassium methacrylate. Optionally, mildew-proofing agents and antibacterial agents are added. Suitable catalysts include organic tin esters, organic tin chelates, alkoxy titanium compounds, titanium chelates, and guanidyl-containing silicon compounds.

Preparation of Composition

Any desired method may be employed in preparing the organopolysiloxane composition of the invention. The composition may be prepared simply by mixing the predetermined amounts of the foregoing components in a conventional manner. The composition cures when it is allowed to stand at room temperature. With respect to the molding method and curing conditions, an appropriate combination for a particular composition may be selected from well-known methods and conditions.

The organopolysiloxane composition of the invention, when used in bonding and sealing of magnesium alloys, exhibits excellent self-adherence without a need for chemical treatment on the magnesium alloys.

The curing conditions for the organopolysiloxane composition may be similar to those employed for conventional RTV condensation curable silicone rubber compositions, and typically include holding or curing in an environment of 23±2° C and RH 50±5% for 7 days.

The organopolysiloxane composition cures to a magnesium alloy to construct a composite article.

The magnesium alloys to which the inventive composition is applicable include die casting, casting and malleable magnesium alloys, for example, AZ-31, AZ-91, AZ-60, AS-41, and AS-21 (by the ASTM standard nomenclature).

Examples of the composite article include information electronic equipment such as mobile phones, digital video cameras, digital cameras, liquid crystal projectors, plasma displays, personal computers, MD players, DVD recorders, and vehicle components, typically automotive components such as electric and electronic parts, oil pans, intake manifolds, lock housing parts, steering upper brackets, and steering wheels.

EXAMPLE

Examples are given below by way of illustration and not by way of limitation. Note that all parts are by weight, and the viscosity is measured at 23° C. by a rotational viscometer.

Example 1

Composition 1 was prepared by adding 100 parts of colloidal calcium carbonate surface treated with fatty acid to 100 parts of a hydroxyl-endblocked polydimethylsiloxane having a viscosity of 50,000 mPa·s at 23° C., mixing them on a mixer, further adding 9 parts of methyltrimethoxysilane, 1.5 parts of diisopropoxy-bis(acetylacetone)titanium, and 0.4 part of 3,3', 4,4'-benzophenonetetracarboxylic dianhydride to the mixture, and thoroughly mixing them in a reduced pressure.

Example 2

Composition 2 was prepared by adding 100 parts of zinc oxide and 100 parts of fumed silica surface treated with dimethyldichlorosilane to 100 parts of a trimethoxy-endblocked polydimethylsiloxane having a viscosity of 50,000 mPa·s at 23° C., mixing them on a mixer, further adding 3 parts of vinyltrimethoxysilane, 3 parts of diisopropoxytitanium bisacetylacetonate, and 1 part of succinic anhydride to the mixture, and thoroughly mixing them in a reduced pressure.

Comparative Example 1

Composition 3 was prepared as in Example 1 except that 0.4 part of 3,3',4,4'-benzophenonetetracarboxylic dianhydride was omitted.

Comparative Example 2

Composition 4 was prepared as in Example 1 except that 0.4 part of γ-aminopropyltriethoxysilane was used instead of 0.4 part of 3,3',4,4'-benzophenonetetracarboxylic dianhydride.

Comparative Example 3

Composition 5 was prepared as in Example 1 except that 1 part of ethylenediaminopropyltrimethoxysilane was used instead of 0.4 part of 3,3',4,4'-benzophenonetetracarboxylic dianhydride.

Each of these silicone rubber compositions was cast into a mold frame of 2 mm high and cured at 23° C. and RH 50% for 7 days into a rubber sheet of 2 mm thick. The rubber physical properties (hardness, elongation at break, tensile strength) of the 2-mm rubber sheet were measured according to JIS K6249.

Using these silicone rubber compositions and magnesium alloy plates (AZ-91, AZ-31) of 25 mm wide and 100 mm long, shear bond strength specimens having a bonded area of 2.5 mm² and an adhesive thickness of 1 mm were assembled. After curing at 23° C. and RH 50% for 7 days, the specimens were tested according to JIS K6850 for measuring shear bond strength and percent cohesive failure. The results are shown in Table 1.

TABLE 1

| Physical properties | Example 1 | Example 2 | Comparative Example 1 | Comparative Example 2 | Comparative Example 3 |
|---|---|---|---|---|---|
| Hardness (durometer A) | 45 | 50 | 45 | 48 | 46 |
| Elongation at break (%) | 400 | 450 | 420 | 460 | 440 |
| Tensile strength (MPa) | 2.5 | 3.2 | 2.7 | 2.6 | 2.2 |
| AZ-91 shear strength (MPa) | 1.5 | 2.0 | 0.2 | 0.2 | 0.3 |
| AZ-91 cohesive failure (%) | 80 | 90 | 0 | 0 | 0 |
| AZ-31 shear strength (MPa) | 1.6 | 2.2 | 0.2 | 0.3 | 0.3 |
| AZ-31 cohesive failure (%) | 90 | 100 | 0 | 0 | 0 |

Japanese Patent Application No. 2004-254461 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organopolysiloxane composition for magnesium alloy bonding comprising
   (A) 100 parts by weight of at least one organopolysiloxane selected from the group consisting of an organopolysiloxane having the general formula (1):

$$HO(SiR_2O)_nH \quad (1)$$

wherein R is each independently a substituted or unsubstituted monovalent hydrocarbon radical of 1 to 10 carbon atoms, and n is an integer of at least 10, an organopolysiloxane having the general formula (2):

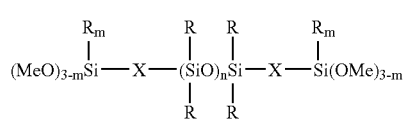

wherein R and n are as defined above, Me is methyl, X is an oxygen atom or an alkylene radical of 2 to 5 carbon atoms, m is independently 0 or 1, and an organopolysiloxane having the general formula (3):

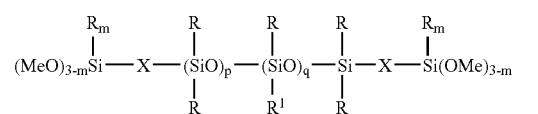

wherein R, Me, X and m are as defined above, p is an integer of at least 10, q is an integer of 1 to 5, and $R^1$ is a branching chain containing a hydrolyzable radical of the formula (4):

wherein R, Me, X and m are as defined above,
   (B) 0.1 to 50 parts by weight of an organosilicon compound having at least three hydrolyzable radicals each bonded to a silicon atom in the molecule and/or a partial hydrolyzate thereof, and
   (C) 0.1 to 15 parts by weight of an acid anhydride excluding acid anhydride functional silane coupling agents.

2. The organopolysiloxane composition of claim 1, further comprising (D) 1 to 500 parts by weight of at least one filler per 100 parts by weight of component (A).

3. A composite article comprising
   a magnesium alloy and
   an organopolysiloxane composition comprising
      (A) 100 parts by weight of at least one organopolysiloxane selected from the group consisting of an organopolysiloxane having the general formula (1):

$$HO(SiR_2O)_nH \quad (1)$$

wherein R is each independently a substituted or unsubstituted monovalent hydrocarbon radical of 1 to 10 carbon atoms, and n is an integer of at least 10, an organopolysiloxane having the general formula (2):

wherein R and n are as defined above, Me is methyl, X is an oxygen atom or an alkylene radical of 2 to 5 carbon atoms, m is independently 0 or 1, and an organopolysiloxane having the general formula (3):

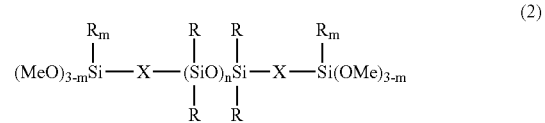

wherein R, Me, X and m are as defined above, p is an integer of at least 10, q is an integer of 1 to 5, and $R^1$ is a branching chain containing a hydrolyzable radical of the formula (4):

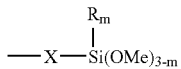

wherein R, Me, X and m are as defined above, (B) 0.1 to 50 parts by weight of an organosilicon compound having at least three hydrolyzable radicals each bonded to a silicon atom in the molecule and/or a partial hydrolyzate thereof, and (C) 0.1 to 15 parts by weight of an acid anhydride excluding acid anhydride functional silane coupling agents in the cured state bonded thereto.

4. The composite article of claim 3, wherein said organopolysiloxane composition further comprises (D) 1 to 500 parts by weight of at least one filler per 100 parts by weight of component (A).

5. The organopolysiloxane composition of claim 1, wherein component (A) is a hydroxyl-endblocked polydimethylsiloxane having a vicosity of 50,000 mPa·s at 23 °C., component (B) is methyltrimethoxysilane, and component (C) is 3,3', 4, 4'-benzophenonetetracarboxylic dianhydride.

* * * * *